United States Patent [19]

Christianson et al.

[11] Patent Number: 4,662,472
[45] Date of Patent: May 5, 1987

[54] ELECTRIC TRACTOR

[76] Inventors: Leslie L. Christianson, Rte. 3, Box 118; Ralph Alcock, 127 Jefferson Ave. South; Donell P. Froehlich, 2120 Derdall Dr.; Mylo A. Hellickson, 2104 Olwien St., all of Brookings, S. Dak. 57006

[21] Appl. No.: 654,168

[22] Filed: Sep. 24, 1984

[51] Int. Cl.⁴ .................. B60K 17/30; H02P 5/16
[52] U.S. Cl. ................... 180/235; 180/53.5; 180/65.7; 180/69.6
[58] Field of Search ............. 180/235, 53.1, 53.5, 180/53.8, 69.6, 65.1, 65.6, 65.7, 65.8, 65.4

[56] References Cited

U.S. PATENT DOCUMENTS

| | | | |
|---|---|---|---|
| 2,683,384 | 7/1954 | Rogers | 180/69.6 |
| 2,787,331 | 4/1957 | Le Tourneau et al. | 180/235 |
| 3,270,829 | 9/1966 | Steiger et al. | 180/235 |
| 3,334,702 | 8/1967 | Granryd | 180/235 |
| 3,336,997 | 8/1967 | Yates et al. | 180/235 |
| 3,356,173 | 12/1967 | Holcombe | 180/235 |
| 3,943,420 | 3/1976 | Hind | 180/65.8 |
| 4,113,045 | 9/1978 | Downing, Jr. | 180/65.4 |
| 4,117,901 | 10/1978 | Mustered | 180/51 |
| 4,131,170 | 12/1978 | van der Lely | 180/69.6 |
| 4,405,028 | 9/1983 | Price | 180/65.7 |
| 4,424,878 | 1/1984 | van der Lely | 180/235 |

Primary Examiner—John J. Love
Assistant Examiner—Donn McGiehan
Attorney, Agent, or Firm—Kinney & Lange

[57] ABSTRACT

An articulated battery-powered electric tractor includes front and rear frame members which are pivotally connected for movement about a substantially vertical axis. A hydraulically-actuated articulation apparatus pivots the front and rear frame members with respect to each other. Wheels support the frame members for travel over the ground. A power-take-off shaft is mounted to the front frame member and is used for driving implements. Electric energy is stored in batteries which are mounted to the rear frame member. The first electric motor is mounted to the rear frame member and is used to drive the tractor wheels. A second electric motor is mounted to the front frame member and is used to drive the power-take-off shaft and the hydraulic articulation apparatus.

28 Claims, 5 Drawing Figures

ELECTRIC TRACTOR

BACKGROUND OF THE INVENTION

1. Field of the Invention

The present invention relates to tractors. In particular, the present invention relates to battery-powered electric tractors.

2. Description of the Prior Art

Across the United States and throughout the world, agricultural tractors are used to plow fields, plant seed, harvest crops and perform countless other chores. Indeed, these vehicles are extremely versatile and well suited for use within the often harsh agricultural environment. Modern tractors are almost exclusively powdered by internal combustion engines which run on petroleum-based fuels. The diesel engine has in fact become the most popular power source for agricultural tractors. These engines provide acceptable power output characteristics and, until recently, fuel has been readily available, even though relatively expensive.

The characteristics of tractors powered by internal combustion engines are, however, less than ideal. Operating expenses are heavily dependent upon the price of fuels. Gasoline and diesel fuel prices have been rising sharply in recent years, greatly increasing the operating expenses. Extensive use within harsh environments often results in mechanical failures. Internal combustion engines on tractors also require a great deal of complicated and expensive maintenance. Diesel engines are also very difficult to start during cold weather. Tractor "down time" due to these factors can be very expensive for a farmer, especially when they occur during critical time periods.

It is undesirable to use tractors driven by internal combustion engines for many farmyard tasks. Extensive work within enclosed buildings is often required. Hazards posed by exhaust fumes severely restrict the use of tractors powered by internal combustion engines for these applications. Livestock are easily disturbed by the noise of internal combustion engines. It is, therefore, undesirable to use tractors of this type for chores performed in close proximity to livestock.

Although diesel engines do provide some degree of torque "back up" with reduced engine speed, their power output characteristics are less than ideal. Another problem is that the power-take-off (PTO) which is used to drive implements attached to a tractor is typically driven by the main tractor engine. Even though the PTO may be driven through a separate transmission, its operating speed is a function of tractor engine speed. This can result in undesired limitations on the speed at which an operator can run the implements.

Potential uses for an electric battery-powered tractor are becoming more evident every day. A study by Resen et al entitled "Electric Vehicles—Assessment of Potential as it Relates to Farm Size," A.S.A.E. Paper NCR80-201 (1980), has suggested that up to half of all tasks on eastern South Dakota farms could be performed by a battery-powered tractor. Similar projections were made for farms throughout the United States. Current research indicates that battery-powered tractors are especially well suited for "chore-type" tasks, such as hauling, scraping, feedlot operation and the like.

In a paper entitled "State-of-the-Art Assessment of In-Use Electric and Hybrid Vehicles," DOE/TIC-10231 (1979), the Department of Energy concluded that electric vehicles have a useful operating life far longer than vehicles with internal combustion engines. In general, electric vehicles require much less maintenance than those powered by internal combustion engines. Reduced maintenance expenses and "down time" are significant.

Electric vehicles are extremely easy to operate, quick to respond, and start with the flick of a switch. Since they do not produce toxic exhaust fumes, they may be safely used inside buildings. This feature is an important one for both the operator and livestock.

Electric tractors are much quieter than those powered by internal combustion engines. This is important in reducing hearing loss among farmers and in minimizing noise which is particularly objectionable in urban fringe areas. More signficantly, quiet operation allows a skilled operator to hear and detect equipment problems and more carefully observe livestock health.

Energy concerns are paramount with today's farmer. This fact is evidenced by intense interest in alcohol, solar, wind and other alternative energy sources. The energy vulnerability of farm operators can be greatly reduced by the adoption of electric vehicles. Electricity is inherently more versatile than oil-derived fuels and can be generated from a great variety of energy sources. Although all energy costs will likely increase over the years, it is believed that oil-derived fuel costs will increase more rapidly than electrical costs. Studies conducted by the Department of Energy have concluded that with predicted technological advances, electric vehicles will be over 50% less expensive to operate than their internal combustion counterparts by 1990.

Electric tractors will undoubtedly play an increasingly important role in agricultural applications. Their advantages are well documented. There is a continuing need for electric tractors with different power output characteristics. The electric tractor should have a power-take-off which can be operated at a wide variety of speeds independently from the drive motor. The electric tractor should be reliable and require infrequent maintenance. In addition, the tractor should be safe, clean, quiet and easy to operate.

SUMMARY OF THE INVENTION

The present invention is a battery-powered electric tractor which includes a frame upon which structural elements of the tractor are mounted. Ground-engaging means support the frame for over-the-ground travel. The tractor also includes power-take-off means mounted to the frame for driving implements. First electric motor means are mounted to the frame for driving the ground-engaging means. Second electric motor means are mounted to the frame and are used to drive a power-take-off means. Both the first and second electric motor means are supplied with electric energy from storage means.

In preferred embodiments, the frame is articulated and includes first and second frame members which are pivotally connected for movement about a substantially vertical axis. Hydraulic articulation means are used to pivot the front and rear frame members with respect to each other. The hydraulic means are driven by the first electric motor means.

In still other embodiments, the storage means include batteries and the ground-engaging means include wheels. Electric control means are used to control the flow of electric energy from the batteries to the first and second motor means in response to operator controlled transducer means. The control means vary the width and frequency of voltage pulses applied to the motor means.

DETAILED DESCRIPTION OF THE PREFERRED EMBODIMENTS

Figure 1:
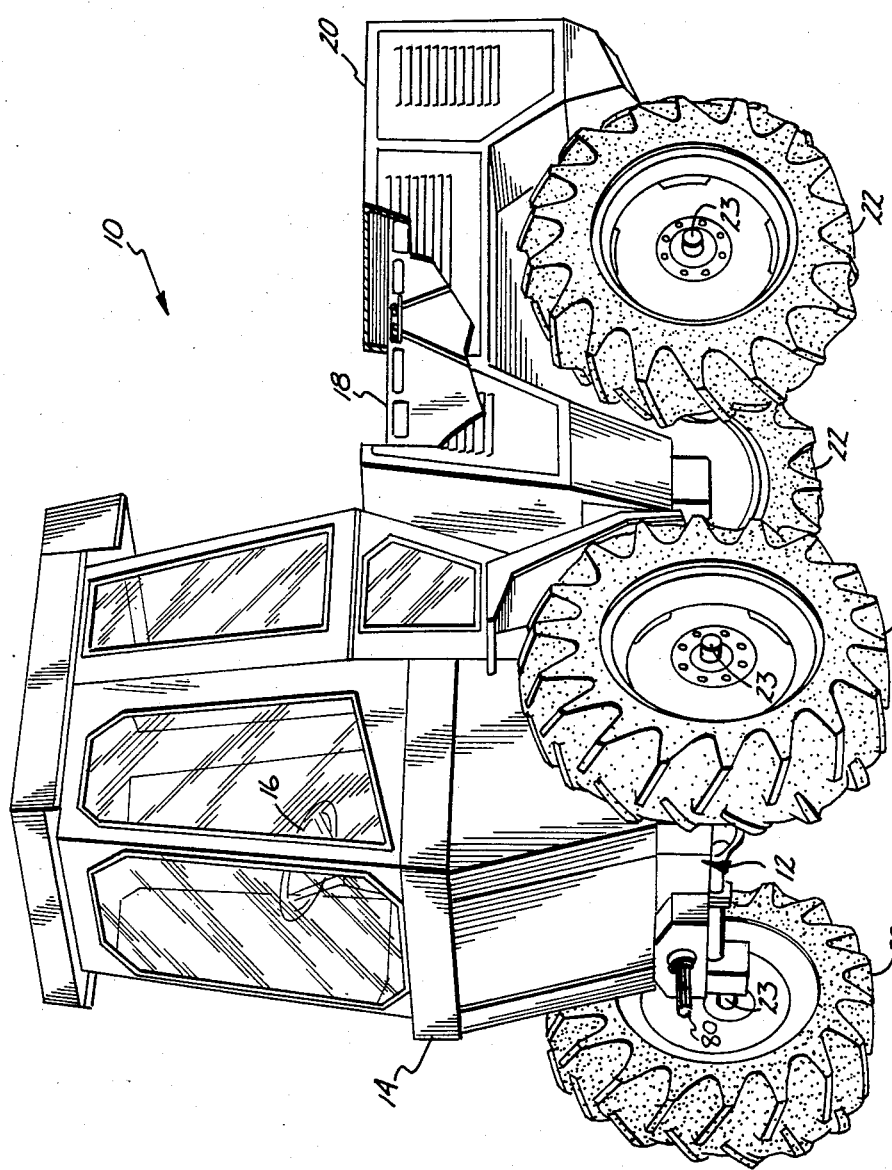
FIG. 1 is a perspective view of the electric tractor of the present invention.

Battery-powered electric tractor 10 of the present invention is illustrated generally in FIG. 1. Tractor 10 is very easy to operate and requires little maintenance. Studies have shown that the vehicle is well suited for many "chore-type" tasks, including scraping, hauling and feedlot operation.

As shown in FIG. 1, tractor 10 includes frame 12 upon which all mechanical structures of the vehicle are assembled. Positioned near a front of frame 12 is cab 14. An operator of electric tractor 10 will be seated within cab 14. Cab 14 will include all control apparatus required to operate the vehicle. Although not shown, this control apparatus will include a start switch, speed control levers, gear selection levers, and various instruments. Steering wheel 16 is also positioned within cab 14 and is used to steer the vehicle.

In preferred embodiments, tractor 10 is a four-wheel drive vehicle. As shown in FIG. 1, ground-engaging wheels 22 are mounted to axles 23. Ground-engaging wheels 22 are driven by an electric motor and drive system which will be fully described. Tractor 10 is powered by batteries 18 which are shown mounted near a rear of frame 12. Batteries 18 are enclosed by panels 20.

A. Frame

Figure 2:
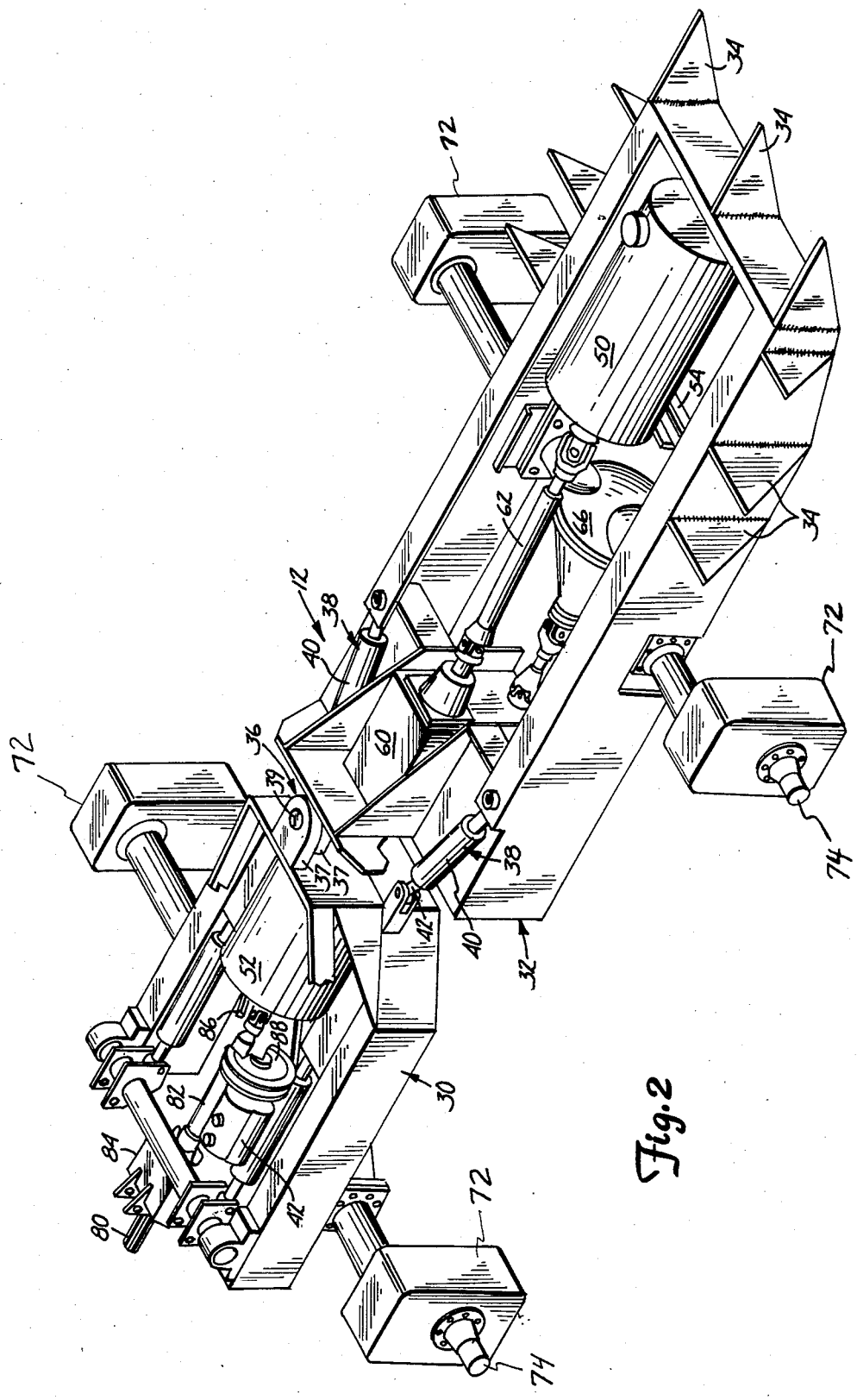
FIG. 2 is a perspective view of the tractor frame showing the traction and PTO motors mounted thereto.

Frame 12 of tractor 10 is best illustrated in FIG. 2. In a preferred embodiment, frame 12 is articulated and includes first frame member 30 and second frame member 32. As shown, first and second frame members 30 and 32, respectively, are generally rectangular in shape. Support gussets 34 are rigidly mounted to frame 12 and are used as supports onto which other structural elements of tractor 10 are mounted.

First and second frame members 30 and 32, respectively, are pivotally connected together by pivot apparatus 36. Pivot apparatus 36 includes a plurality of brackets 37 (two are shown in FIG. 2), which are mounted to first and second frame members 30 and 32. Pivot pin 39 interconnects brackets 37. Pivot apparatus 36 allows first and second frame members 30 and 32, respectively, to pivot with respect to one another about a generally vertical axis.

In preferred embodiments, hydraulic means such as hydraulic jacks 38 are used to move the first and second frame members with respect to each other about pivot apparatus 36. As shown in FIG. 2, each hydraulic jack 38 includes a cylinder 40 which is pivotally mounted to an outer edge of second frame member 32. Each hydraulic jack 38 also includes piston 42 which is pivotally mounted near an outer edge of first frame member 30. Hydraulic jacks 38 are supplied with hydraulic fluid carried within a reservoir on frame 12 (not shown). The reservoir is in turn driven by hydraulic pump 42. The hydraulic control system is used to actuate hydraulic jacks 38 in response to motion of steering wheel 16. Although not shown, hydraulic control systems of this type are common and well known within the art.

Although preferred embodiments of tractor 10 have been described with reference to frame 12 which is articulated, it must be understood that a conventional frame and steering mechanism may also be used. In preferred embodiments, frame 12 is comprised of an articulated frame manufactured by the Versatile Company of Canada.

B. Electric Motors

Electric tractor 10 of the present invention utilizes two independently-controlled electric motors. Traction motor 50, as best shown in FIG. 2, is used to drive ground-engaging wheels 22. PTO motor 52 is used to drive a power-take-off. Through the use of two separate motors, each individually controlled, it is possible to independently vary vehicle speed and power-take-off speed. This feature significantly enhances the capabilities of electric tractor 10.

As shown in FIG. 2, traction motor 50 is mounted by brackets 54 to second section 32 of frame 12. In preferred embodiments, traction motor 50 is comprised of a 50 horsepower DC series wound motor manufactured by the General Electric Company. This motor has a one hour rating of 50 HP at 1500 rpm. Operating speed range of traction motor 50 is between 930 and 2750 rpm. Although traction motor 50 can operate at speeds lower than 930 rpm, these speeds are undesirable due to large current demand. Operation at speeds in excess of 2750 rpm can result in damage to traction motor 50. These speeds are prevented by an "overspeed" switch which will be described subsequently. Traction motor 50 can supply 37 kW for one hour and 81 kW for 3.3 minutes. Also included within traction motor 50 is a thermistor (shown in FIG. 4), which controls the operation of a blower for cooling the motor when a particular temperature is reached.

PTO motor 52 is preferably mounted to first secton 30 of frame 12. In preferred embodiments, PTO motor 52 is a DC series wound 25 HP motor manufactured by the General Electric Company. This motor has a one hour rating of 17 kW. Like traction motor 50, PTO motor 52 includes a thermistor controlled blower for cooling and overspeed protection.

C. Batteries

Electric tractor 10 is powered by industrial grade lead-acid batteries 18. Batteries 18 are preferably installed in two units, each having 32 cells. This arrangement provides a nominal operating voltage of 128 volts. The batteries currently used have a capacity of 340 amp-hours at a six hour discharge rate. Batteries 18 are capable of powering tractor 10 for four to eight hours in a typical farm chore routine. Recent interest in electric power has been generating advances in battery technology. It is expected that batteries having characteristics far exceeding those described above will be available within the upcoming years.

The capacity and discharge energy of lead-acid batteries 18 are severely affected by low temperatures.

This can create problems for a tractor which is used in colder environments. One method utilized in the present invention to overcome the problem is to provide a layer of insulation around batteries 18. An alternative technique might be to include a heating system within the battery compartment.

The current charge condition of batteries 18 is important information for the operator of tractor 10. Electric tractor 10 therefore includes instrumentation within cab 14 which displays information on the current state of batteries 18. Voltmeters register the effective voltage which is being applied to traction motor 50 and PTO motor 52. Ammeters display instantaneous current consumption of both motors. A tachometer indicates the rotational speed of each motor. Also included is a "fuel gauge" which provides the operator with an indication of the state of charge of the batteries. The initial battery condition is used as a reference point and each watt-hour consumed is subtracted from this reference.

Batteries 18 require periodic maintenance. Specific gravity of the electrolyte within each battery cell must be measured periodically, at least once per month. In addition, the specific gravity in two pilot cells, one in each unit of the battery, is checked on a daily basis. Batteries 18 must be re-charged when their capacity has been reduced to 20% of its nominal rating. Recharging typically takes from six to eight hours, depending on the final discharg rate of the battery.

D. Transmission and Drive System

Figure 3:
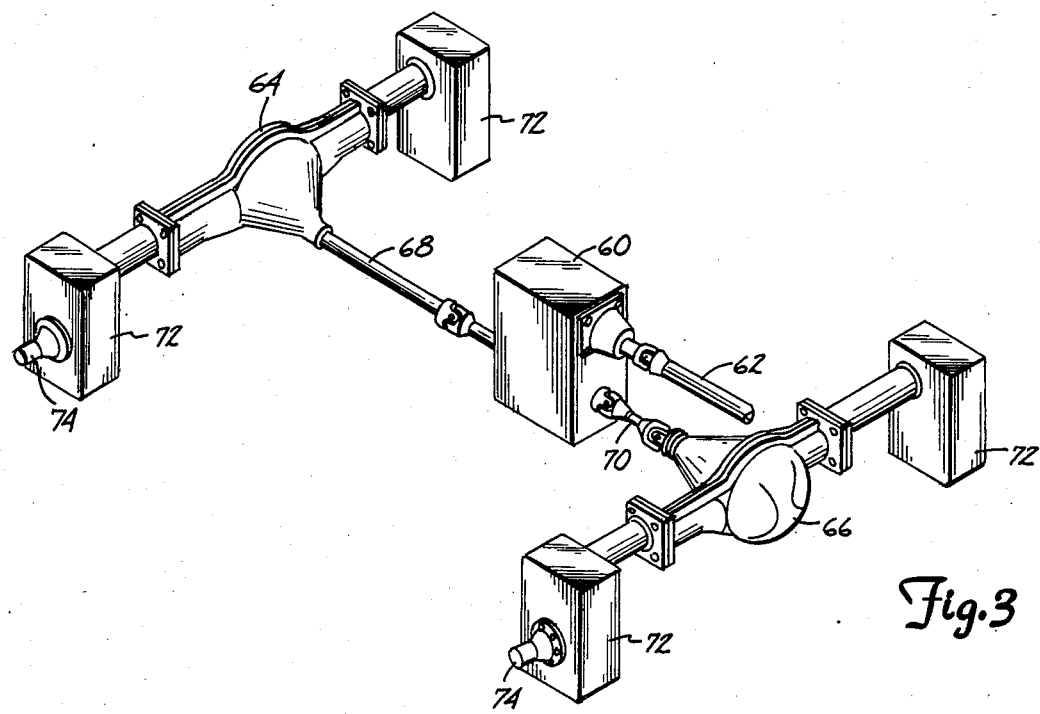
FIG. 3 is a perspective view of the drive system and transmission of the tractor.

The transmission and drive system for electric tractor 10 is best illustrated in FIGS. 2 and 3. Rotational motion is transferred from traction motor 50 to transmission 60 by first drive shaft 62. As shown in FIG. 2, transmission 60 is mounted to second member 32 of frame 12. In a preferred embodiment, transmission 60 is a three-range gear box. The first gear setting has an overall ratio of 72:1, the second gear has a ratio of 36.4:1, while the third gear has a ratio of 17.67:1. Ground speed of tractor 10 within these three gears is 0–8, 0–16, and 0–24 km/hr., respectively. Gear ratio of transmission 60 is selected by the operator through controls within cab 14.

In a preferred embodiment, electric tractor 10 is a four-wheel drive vehicle and includes first differential 64 mounted to first frame member 30 and a second differential 66 mounted to second frame member 32. Transmission 60 drives first differential 64 and second differential 66 through second and third drive shafts 68 and 70, respectively. First, second and third drive shafts 62, 68 and 70, respectively, each include at least one universal joint.

Differentials 64 and 66 transmit power through axles (not shown) to axle gear boxes 72. Each axle gear box 72 includes axle 74 upon which ground-engaging wheels 22 are mounted. The transmission and drive system described above is identical to that manufactured by the Versatile Company and included on the Versatile 160 Tractor.

PTO motor 52 is used to drive power-take-off shaft 80 shown in FIG. 1. As best shown in FIG. 2, PTO motor 52 is coupled to power-take-off shaft 80 through fourth drive shaft 82 and PTO gear box 80. Driving PTO output shaft 80 by PTO motor 52 has been found to be very advantageous. The system allows an operator to vary the speed of PTO output shaft 80 anywhere within the operating speed rage of PTO motor 52. Output speed of PTO shaft 80 is therefore independent of traction motor 50 and vehicle speed. This feature is very convenient and useful in many applications.

Although the hydraulic system of electric tractor 10, including pump 42, could be driven by a third electric motor, it has been found to be both cost and power efficient to drive hydraulic pump 42 by PTO motor 52. As shown in FIG. 2, hydraulic pump 42 is driven from PTO motor 52 by belt 86 and pulley 88.

E. Electric Control System

Figure 4:
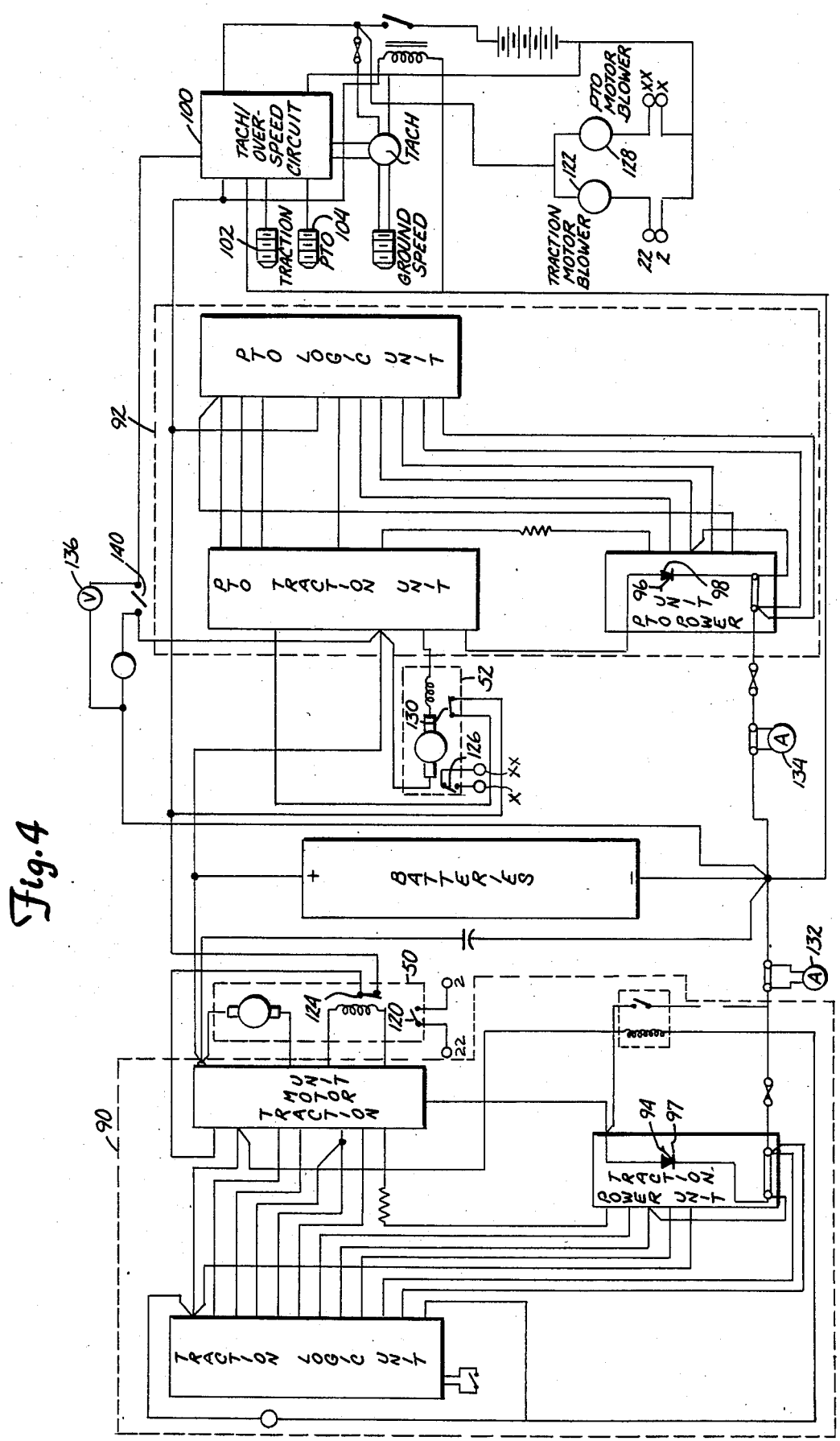
FIG. 4 is a schematic diagram of the electric control system of the tractor.

An electric control system for electric tractor 10 is illustrated in FIG. 4. The electric control system is used to regulate the flow of electric energy from batteries 18 to both traction motor 50 and PTO motor 52. In preferred embodiments, the electrical control system includes two controllers manufactured by the Cableform Company. Controller 90 is used to regulate the flow of electric energy from batteries 18 to traction motor 50. Similarly, controller 92 regulates the flow of electric energy from batteries 18 to PTO motor 52.

Controllers 90 and 92 operate in an identical manner. Each controller applies pulse width modulated (PWM) and/or frequency modulated (FM) voltage pulses to the respective motor.

To vary the speed of either motor, an operator will adjust the position of a control lever located within cab 14. The control lever is attached to a potentiometer which supplies a voltage of zero to five volts to input logic circuitry within the controller. Circuitry within the controller converts this voltage signal to a signal of proportional frequency. This signal is further processed and applied to switching terminals 94 and 96 of silicon controlled rectifiers (SCR) 97 and 98. When turned on, SCR 97 interconnects batteries 18 with traction motor 50. Similarly, batteries 18 are interconnected with PTO motor 52 when SCR 98 is switched on. When SCRs 97 and 98 are turned on, the full 128 volt potential of batteries 18 is applied across traction motor 50 and PTO motor 52, respectively. The pulse width modulated and frequency modulated signals applied to switching terminals 94 and 96 result in voltage pulses of varying duty cycle being applied to traction motor 50 and PTO motor 52, respectively. Speed of motors 50 and 52 is thereby varied since they respond only to an average of the applied voltage.

The electric control system shown in FIG. 4 also includes a tach/overspeed circuit 100. Traction motor speed and PTO motor speed are monitored by transducers 102 and 104, respectively. Transducer 102 supplies an electrical signal indicative of speed of traction motor 50. Similarly, transducer 104 supplies an electrical signal indicative of PTO motor 52. When either the PTO or traction motor reaches its maximum operating speed, tach/overspeed circuit 100 detects this state and actuates a device such as a relay (not shown) which overrides the respective controller and disconnects batteries 18 from the motor. The principal object of tach/overspeed circuit 100 is, therefore, to provide protection for traction motor 50 and PTO motor 52.

Figure 5:
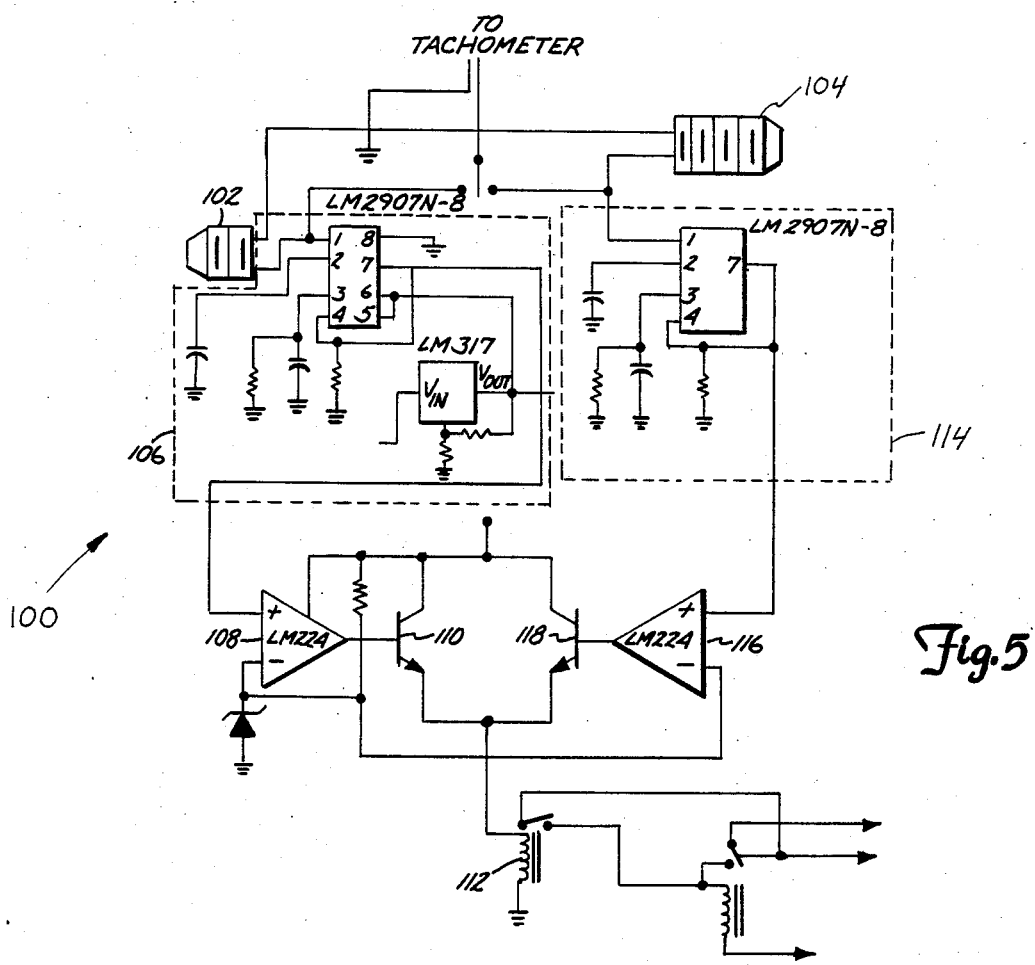
FIG. 5 is a detailed schematic of the tach/overspeed circuit.

A preferred embodiment of tach/overspeed circuit 100 is illustrated in FIG. 5. Traction motor speed sensor 102 provides an electrical signal indicative of traction motor rpm. Frequency-to-voltage conversion circuit 106 converts that signal into a voltage signal representative of traction motor speed. Comparator 108 compares the voltage signal produced by frequency-to-voltage conversion circuit 106 to a reference voltage indicative of maximum motor rpm. When traction motor speed reaches its maximum rpm, comparator 108 will drive transistor 110 thereby actuating a switching device, such as relay 112. When actuated, relay 112 will cause batteries 18 to be disconnected from traction motor 50.

Tach/overspeed circuit 100 protects PTO motor 52 from overspeed in an identical manner. PTO shaft speed sensor 104 supplies frequency-to-voltage circuit 114 with a signal indicative of the speed of PTO motor 52. Frequency-to-voltage conversion circuit 114 supplies a voltage signal proportional to the speed of PTO motor 52 to comparator 116. When a voltage indicating the maximum speed of PTO motor 52 is reached, comparator 16 will drive transistor 118 thereby actuating relay 112. In this way, electrical energy from batteries 18 is disconnected from PTO motor 52. As previously described, traction motor 50 includes thermostatic switch 120 which will close when traction motor 50 reaches a predetermined temperature. Upon the closure of the switch 120, traction motor blower 122 will be actuated to assist in cooling the motor. In the event a second and higher predetermined temperature is reached, thermostatically controlled switch 124 will open and cause batteries 18 to be disconnected from the motor. A similar thermostatic control system is included within PTO motor 52. Thermally controlled switch 126 will close when the first predetermined temperature is reached. This will actuate PTO motor blower 128. Likewise, thermostatic switch 130 will open when the second predetermined temperature is reached. PTO motor 52 is thereby disabled.

An amount of current being drawn by traction motor 50 is monitored by ammeter 132 which is mounted within cab 14. Similarly, the current drawn by PTO motor 52 is monitored by ammeter 134. A voltage of batteries 18 is monitored within cab 14 by voltmeter 136. Switch 140 is actuated by an operator and initiates the application of electric energy to traction motor 50 and PTO motor 52.

To summarize, the present invention is an electric tractor which is clean and efficient to operate. The tractor is especially well suited for performing "chore-type" tasks on a farm.

Although the present invention has been described with reference to preferred embodiments, workers skilled in the art will recognize that changes may be made in form and detail without departing from the spirit and scope of the invention.

What is claimed is:

1. A battery-powered electric tractor comprising:
    a frame;
    ground-engaging wheel means for supporting the frame for over-the-ground travel;
    storage battery means for storing electric energy;
    power-take-off means mounted on the frame for driving implements;
    first dedicated electric motor means mounted on the frame for driving only the ground-engaging wheel means and supplied with electric energy from the storage battery means;
    mechanical linkage means for transferring motion from the first electric motor means to the ground-engaging wheel means, the mechanical linkage means including transmission means for selecting one of a plurality of ratios between rotational speeds of the first motor means and the ground-engaging wheel means;
    second dedicated electric motor means mounted on the frame for driving only the power-take-off means and supplied with electric energy from the storage battery means;
    first electric control means for controlling the flow of electric energy from the storage means to the first motor means in response to operator controlled first transducer means; and
    overspeed means for preventing the flow of electric energy from the storage means to the motor means when the motor speed reaches an overspeed limit.

2. The tractor of claim 1 wherein the ground-engaging wheel means include four wheels, each wheel being driven by the first electric motor means.

3. The tractor of claim 1 wherein the frame is an articulated frame including a front and a rear frame member pivotally connected for movement about a substantially vertical axis.

4. The tractor of claim 3 and including articulation means for pivoting the front and rear frame members with respect to each other.

5. The tractor of claim 4 wherein the articulation means includes at least one hydraulic cylinder.

6. The tractor of claim 5 and including a hydraulic pump which is driven by the second electric motor means.

7. The tractor of claim 3 wherein the first electric motor means is mounted to the rear frame member.

8. The tractor of claim 7 wherein the second electric motor means is mounted to the front frame member.

9. The tractor of claim 7 wherein the power-take-off means is mounted to the front frame member.

10. The tractor of claim 9 wherein the storage battery means are mounted to the rear frame member.

11. The tractor of claim 9 wherein the power-take-off means includes a rotating shaft.

12. The tractor of claim 1 and including gear means for transferring rotational motion from the second motor means to the power-take-off means.

13. The tractor of claim 1 wherein the control means varies speed of the first motor means by varying a frequency of voltage pulses applied to the first motor means.

14. The tractor of claim 13 wherein the control means varies width of the voltage pulses applied to the first motor means.

15. The tractor of claim 1 wherein the overspeed means includes:
    sensor means for providing an electric signal proportional to speed of the first motor means;
    circuit means for comparing the electric signal to a reference voltage indicative of the overspeed limit and for providing an overspeed signal when speed of the first motor means reaches the overspeed limit; and
    relay means responsive to the circuit means for disconnecting the storage battery means from the first motor means when the overspeed signal is detected.

16. The tractor of claim 1 and including second electric control means for controlling the flow of electric energy from the storage battery means to the second motor means in response to operator controlled second transducer means.

17. The tractor of claim 16 wherein the control means varies speed of the second motor means by varying a frequency of voltage pulses applied to the second motor means.

18. The tractor of claim 17 wherein the control means varies width of the voltage pulses applied to the second motor means.

19. The tractor of claim 16 and including overspeed means for preventing the flow of electric energy from the storage battery means to the second motor means when speed of the second motor means reaches an overspeed limit.

20. The tractor of claim 19 wherein the overspeed means includes:
sensor means for providing an electric signal proportional to speed of the second motor means;
circuit means for comparing the electric signal to a reference voltage indicative of the overspeed limit and for providing an overspeed signal when speed of the second motor means reaches the overspeed limit; and
relay means responsive to the circuit means for disconnecting the storage battery means from the second motor means when the overspeed signal is detected.

21. The tractor of claim 1 wherein the first and second motor means are DC, series wound motors.

22. An articulated battery-powered electric vehicle comprising:
front and rear members pivotally connected for movement about a substantially vertical axis;
a plurality of wheel means for supporting the frame members for travel over the ground;
articulation means for pivoting the front and rear frame members with respect to each other;
power-take-off means mounted to one of the front and rear frame members for driving implements;
storage battery means mounted to one of the front and rear frame members for storing electric energy;
first dedicated electric motor means mounted to one of the front and rear frame members for driving only the wheel means and supplied with electric energy from the storage batter means;
second dedicated electric motor means mounted to one of the front and rear frame members for driving only the power-take-off means and supplied with electric energy from the storage battery means;
mechanical linkage means for transferring motion from the first electric motor means to the wheel means, the mechanical linkage means including transmission means for selecting one of a plurality of ratios between rotational speeds of the first motor means and the wheel means;
first electric control means for controlling the flow of electric energy from the storage means to the first motor means in response to operator controlled first transducer means; and
overspeed means for preventing the flow of electric energy from the storage means to the motor means when the motor speed reaches an overspeed limit.

23. The vehicle of claim 22 wherein the articulation means is driven by the second electric motor means.

24. The vehicle of claim 23 wherein the articulation means includes hydraulic means.

25. The vehicle of claim 24 and further including hydraulic pump means for driving the hydraulic means, the hydraulic pump means being driven by the second motor means.

26. An articulated battery-powered electric vehicle comprising:
front and rear members pivotally connected for movement about a substantially vertical axis;
a plurality of wheel means for supporting the frame members for travel over the ground;
articulation means for pivoting the front and rear frame members with respect to each other;
power-take-off means mounted to one of the front and rear frame members for driving implements;
storage battery means mounted to one of the front and rear frame members for storing electric energy;
first dedicated electric motor means mounted to one of the front and rear frame members for driving only the wheel means and supplied with electric energy from the storage batter means;
second dedicated electric motor means mounted to one of the front and rear frame members for driving only the power-take-off means and supplied with electric energy from the storage battery means;
mechanical linkage means for transferring motion from the first electric motor means to the wheel means, the mechanical linkage means including transmission means for selecting one of a plurality of ratios between rotational speeds of the first motor means and the wheel means;
second electric control means for controlling the flow of electric energy from the storage means to the second motor means in response to operator controlled second transducer means; and
overspeed means for preventing the flow of electric energy from the storage means to the motor means when the motor speed reaches an overspeed limit.

27. A battery-powered electric tractor comprising:
a frame;
ground-engaging wheel means for supporting the frame for over-the-ground travel;
storage battery means for storing electric energy;
power-take-off means mounted on the frame for driving implements;
first electric motor means mounted on the frame for driving only the ground-engaging means supplied with electric energy from the storage means;
second electric motor means mounted on the frame for driving the power-take-off means supplied with electric energy from the storage means;
second electric control means for controlling the flow of electric energy from the storage means to the second motor means in response to operator controlled second transducer means; and
overspeed means for preventing the flow of electric energy from the storage means to the motor means when the motor speed reaches an overspeed limit.

28. The tractor of claim 27 wherein the overspeed means includes:
sensor means for providing an electric signal proportional to motor speed;
circuit means for comparing the electric signal to a reference voltage indicative of the overspeed limit and for providing an overspeed limit; and
relay means responsive to the circuit means for disconnecting the storage means from the motor means when the overspeed signal is detected.

* * * * *